INTERFERENCE SUPPRESSION SYSTEM

Filed Oct. 11, 1945

Inventors
HAROLD L. FLOWERS
JAMES A. WHITE
By M. O. Hayes
Attorney

United States Patent Office 2,860,333

Patented Nov. 11, 1958

2,860,333

INTERFERENCE SUPPRESSION SYSTEM

Harold L. Flowers, Washington, D. C., and James A. White, United States Navy

Application October 11, 1945, Serial No. 621,650

5 Claims. (Cl. 343—17.1)

Figures 1, 2:
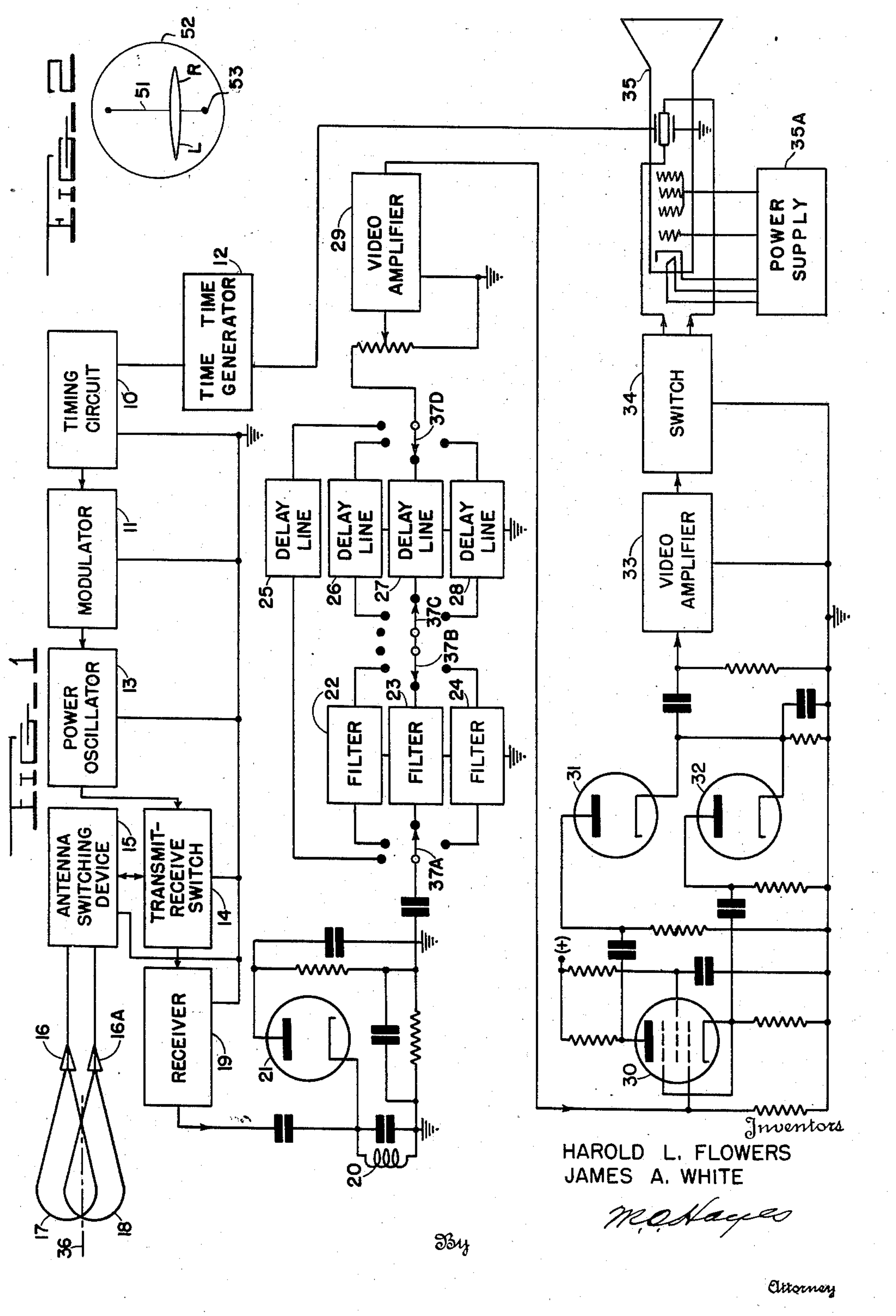

(Granted under Title 35, U. S. Code (1952), sec. 266)

This invention relates to a radio receiver system. More particularly it relates to a receiver system which operates to permit the continuance of radio and reception through interference signals.

In all of the various fields of radio there exists two general types of interference which may logically be classified as deliberate and unintentional or fortuitous.

Unintentional or fortuitous interference can generally be avoided by careful selection of the transmission and reception characteristics of the transmitter and receiver, respectively. Deliberate interference on the other hand is purposely calculated to destroy radio communications and is therefore more difficult to avoid.

One of the fields of radio where interference is experienced is radar. For the sake of brevity, applicants will hereafter describe the present invention as applied to a radar system, it being understood that the teaching of the present invention can readily be applied to other radio systems.

An object of this invention is to construct a radio receiver circuit which provides for the continuance of radio reception through strong and deliberate interference signals.

Another object of this invention is to provide a radio receiver circuit which produces an output signal in accordance with the desired signal and independent of an interfering signal.

Other objects and features of the present invention will become apparent upon a careful consideration of the following detailed description when taken together with the accompanying drawings in which only a single preferred embodiment of the invention has been shown:

Fig. 1 is a schematic diagram showing, partly in block, one embodiment of the present invention; and Fig. 2 is a face view of a cathode ray tube indicator incorporated in the circuit of Fig. 1.

For purposes of illustration only, and for the sake of brevity the present invention is shown in Fig. 1 as incorporated in a radar system similar to that disclosed in the application of H. R. Senf, et al., Serial No. 468,106, filed December 7, 1942, now Patent No. 2,546,170.

Referring now more particularly to the drawings, in general, the transmitting end of the radar system comprises a power oscillator 13 which is suitably adapted to be keyed in short repetitive bursts of energy by a modulator unit 11. The latter in turn is under control of the timing circuit 10 which may consist of a multivibrator or other suitable timing device. Output from the oscillator 13 is applied through the transit-receive switch 14 and antenna switch 15 to a pair of directive antennas 16 and 16A.

Antennas 16 and 16A are so oriented with respect to each other as to produce slightly divergent but overlapping beam patterns 17 and 18 for use in obtaining the bearing of a reflecting object as hereinafter described, it is understood that lobe switching from a single antenna array capable of producing the two divergent patterns could be employed. Antenna switching device 15, which may be of the general class described in the Senf, et al., application, supra, is provided so as to alternately actuate or render potent one antenna 16 or the other 16A at a rate of, for example, 25 cycles per second.

A transmit-receive switch 14, which if desired may also be of the same general types as described in the Senf, et al., application above, is provided for the purpose of decoupling the receiver 19 from the antenna system during intervals of transmission, to thereby prevent damage to the receiver, and to decouple the oscillator 13 from the antenna during intervals of reception to prevent received signal energy from being lost in the oscillator.

Output from receiver 19 is applied through the last or final intermediate frequency transformer 20 to the detector 21. From detector 21 output signals are applied to a video amplifier 29, a phase splitter 30, the push pull detectors 31, 32, a second video amplifier 33 and thence through switch 34 to the indicator 35.

Indicator 35 is preferably of the cathode ray tube variety and switch 34 is preferably of the type disclosed in the Senf, et al., application, supra. Switch 34, operating in conjunction with the antenna switch 15 functions to control the application of the output signal from the video amplifier 33 so that it is applied to a right hand deflection plate of the indicator 35 during intervals corresponding to the periods of transmission and reception with antenna 16 and to a left hand deflection plate of the indicator 35 during intervals corresponding to the periods of transmission and reception with antenna 16A.

In this way it may be seen that objects lying to the left, or below as viewed in Fig. 1, of the center line 36 of the composite antenna beam pattern will receive and reflect more energy with operation from the antenna 16A than with operation from antenna 16, thereby producing a stronger indicator beam deflection to the left than to the right. Conversely objects to the right, or above, as viewed in Fig. 1, of the center line 36 will receive and reflect more energy with operation from the antenna 16 than from antenna 16A, thereby producing greater beam deflection to the right than to the left. Equal right and left deflection of the cathode ray tube beam when an object is positioned on the center line 36 is shown in Fig. 2.

To provide a range measurement, the output from the timing circuit 10, which keys the modulator 11 thereby producing a pulse from one of the antennas 16 or 16A depending on the operation of the antenna switch 15, also triggers the time base generator 12. The latter, for example, may be a simple saw-tooth signal generator the output of which is applied, for example, to a vertical deflection plate as the indicator 35 so as to produce an upward sweep of the electron beam as represented by the line 51 in Fig. 2. In this manner, the range of a reflecting object is represented as the interval of time elapsing between the initiation of the vertical sweep at point 53 and the reception of the reflection from the object.

The presence of other signal generating sources in the vicinity of the equipment of Fig. 1 may have an adverse effect upon the proper operation of the equipment. Generally speaking an interfering signal will be of much greater strength than the transmiter echo signal because the interfering signal is a direct transmission with intensity inversely proportional to the square of the distance from source to receiver whereas the reflected signal is a two-way transmission with signal intensity inversely proportional to the fourth power of the distance involved. Thus conventional radio echo locating systems are rendered completely useless even by low-power interfering signal sources.

To render the system usable under conditions of interference by strong signal sources, the heterodyne principle is here empoyed in a unique manner. When interference is experienced, the oscillator 13 is retuned manually so that its frequency will differ from that of the interfering signal by a known amount, preferably greater than the highest major frequency component of the modulation contained on the transmitter echo signal and on the jamming signal. The interference is shown on the cathode ray tube indicator 35 by the presence of undesired signals thereon when the switches 37 are in the position for the straight through radar operation through delay line 25. Switches 37 are placed in position to use the signal path through either filter 22 or 23 when the oscillator 13 is retuned. With switch 37 thus positioned, the oscillator retuning is to such an extent so that the frequency difference between the interfering signal and the oscillator 13 provides a beat frequency signal within the pass band of the filter 22 or 23. For example, a typical frequency difference could be 1.5 mc. where the highest major frequency component is 500 kc. Thus, in the example, among other components, two signals differing in frequency by 1.5 mc. would be carried through the receiver and applied to a linear detector 21. The unilateral action of this detector then produces, among other components, two frequency spectra, a low frequency spectrum containing the original modulation of the transmitter echo signal and of the interfering signal, and a high frequency spectrum containing the difference frequency of 1.5 mc. modulated by the modulation contained on the transmitter echo signal.

In general a heterodyne (difference) output from a heterodyne system is independent of the stronger of the heterodyning signals and is proportional to the weaker of the two signals (provided that the amplitude of the stronger signal is at least four times the amplitude of the weaker signal). Under conditions of strong interference, then, the amplitude of the 1.5 mc. spectra produced is proportional to the amplitude of the weak (echo) signal and independent of the jamming signal only if the heterodyne producing device, in this case detector 21, does not introduce further non-linearity. Thus it is essential that the detector 21 function as a linear device. To this end, a diode detector operating in the linear region of its characteristic curves is employed at point 21. Other types of linear detectors, for example, an infinite impedance cathode follower type could be used.

As previously mentioned, the low frequency spectrum in the detector output consists of the modulation contained on the interfering signal in addition to the modulation on the transmitter echo signal, therefore it is not usable, serving only to obscure and confuse the high frequency (heterodyne) spectrum. A filter system rejecting the low frequency spectrum is thus required so that the indicator 35 is operated only by the heterodyne (high frequency) spectrum.

Under condtions of interference in which the amplitude of the interfering signal is less than four times the amplitude of the transmitter echo signal the beat signal produced by heterodyne action is not linear, therefore the heterodyne operation previously described is not employed. Instead, no attempt is made to obtain a specific frequency difference between the interfering signal and the transmiter echo signal, rather a high pass filter having a cut-off point of, for example, 30 kc. is interposed between the detector 21 and the indicator 35. Thus the lower frequency components of the detector output are suppressed. In connection with the previous example, to provide the frequency selection required, three filters 22, 23, and 24 possessing characteristics of band pass between 1.0 and 2.0 mc., high pass above 1.0 mc., and high pass above 30 kc., respectively, are incorporated in the circuit. Selection of any one of these filters as well as a condition of unfiltered operation is accomplished by means of the four position switches 37A, 37B, 37D.

The various filters thus provided, as well as the condition of straight-through operation, produce different time delay of the detector output signal. This variable delay is undesirable particularly where time elapsing between the emission of a burst of energy from antennas 16, 16A and the reception of an echo signal is used to indicate with accuracy the distance to the reflecting object. To overcome this difficulty, and in connection with the above example, four delay lines having different delay periods and selected by means of the selection switches 37C, 37D are provided to insure a uniform delay of the detector output signal regardless of the position of switches 37A, 37B.

The high frequency spectrum contained in the output of detector 21 and applied to the video amplifier 29 is essentially of a sinusoidal nature since it comprises a a carrier signal (1.5 mc. in the above example) and upper and lower modulation sideband frequencies. Therefore a further detection of this signal is required before application to the indicator 35. A push-pull detector comprising the circuits associated with the two diodes 31, 32 and a phase splitting circuit 30 is employed. Since synchronism between the interfering signal and the radio frequency signal of oscillator 13 is not possible, successive heterodyne pulse signals will start with various phase angles. Therefore the push-pull detector circuit which supplies energy during both crests of the sinusoidal signal is preferable to a half-wave detector.

As previously mentioned, the pulse output from the detector 31, 32 is applied to a second video amplifier 33 and the output therefrom is applied through switch 34, which operates in synchronism with the antenna switch 15, to the right deflection plate of the indicator 35 during intervals corresponding to the periods of operation with antenna 16 and to the left deflection plate of indicator 35 during intervals corresponding to the periods of operation with antenna 16A.

It is essential that the operation of all circuits and elements from the antennas 16, 16A through the push-pull detector 31, 32 be linear regardless of signal amplitude. This is necessary because it is highly improbable that the location of the interfering signal source will be along an extension of the line 36 of the antenna field pattern when that line is oriented in the direction of the reflecting object, unless the reflecting object is at the source of the interfering signal.

From the foregoing description it will be apparent that modifications thereof are possible, and while the device herein described, and the form of apparatus for operating it, constitutes a preferred embodiment of the invention, it is to be understood that the invention is not limited to this precise device and form of apparatus, and that changes may be made therein without departing from the scope of the invention which is defined in the appended claims.

The invention described herein may be manufactured and used by or for the Government of the United States of America for governmental purposes without the payment of any royalties thereon or therefor.

What is claimed is:

1. A radiant energy operative system for detecting remote objects and having reduced susceptibility to interference signals comprising, a tunable transmitter operable to generate carrier frequency energy having modulation frequencies of selected characteristics, a radiator system connected to the transmitter for radiating the generated energy and intercepting energy returned by remote objects, a receiver system connected to said radiator system providing delivery of returned transmitter energy and interference signals, a linear detector connected to the output of said receiver system operative to produce heterodyne beat signals between said returned transmitter energy and said interference signals proportional to the amplitude of said returned transmitter energy, a frequency selective circuit connected to the output of said linear detector responsive to deliver the heterodyne beat signals and suppress the modulation frequencies of the returned transmitter energy and any modulation contained on the interference signals, a cathode ray tube indicating device, and detector means connected between said cathode ray indicating device and said frequency selective circuit to derive the generated carrier modulation from said heterodyne beat signals.

2. A radiant energy operative system for detecting remote objects and having reduced susceptibility to interference signals having a first frequency comprising, a tunable transmitter operable to generate carrier frequency energy having a second frequency differing from said first frequency by a predetermined amount and having modulation frequencies of selected characteristics, a radiator system connected to the transmitter for radiating the generated energy and intercepting energy returned by remote objects, said radiator system comprising a dual antenna system providing operation in two divergent but partly overlapping field patterns, switching means providing alternate operation from each of said antenna field patterns, a receiver system connected to said radiator system providing delivery of returned transmitter energy and interference signals, a linear detector connected to the output of said receiver system operative to produce heterodyne beat signals between said returned transmitter energy and said interference signals proportional to the amplitude of said returned transmitter energy, a frequency selective circuit connected to the output of said linear detector responsive to deliver the heterodyne beat signals and suppress the modulation frequencies of the returned transmitter energy and any modulation contained on the interference signals, a cathode ray tube indicating device, detector means connected between said cathode ray indicating device and said frequency selective circuit to derive the generated carrier modulation from said heterodyne beat signals, and switching means operating in conjunction with the antenna switching means and serving to apply a desired signal dependent on said carrier modulation to one deflection plate of the cathode ray tube during operation with one of said field patterns and to the other parallel deflection plate of said tube during operation with the other field pattern.

3. In a radio communication system, means for receiving interference signals having a first frequency and desired signals having a second frequency modulated by intelligence signals, a detector coupled to said means and responsive to said interference signals and to said desired signals to produce beat signals modulated by said intelligence signals, a second detector, a frequency selective circuit coupled between the detector and the second detector, said frequency selective circuit having predetermined parameters selected to pass only said beat signals to said second detector, an indicating device coupled to said second detector, said second detector effective to deliver to said indicating device an output signal in dependency on said intelligence signals.

4. In a radio communication system, means for receiving interference signals having a first frequency and desired signals having a second frequency modulated by intelligence signals, a detector coupled to said means and responsive to said interference signals and to said desired signals to produce beat signals modulated by said intelligence signals, a second detector, a frequency selective circuit coupled between the detector and the second detector, said frequency selective circuit having predetermined parameters selected to pass only one of a plurality of modulated frequencies, switching means connected to said frequency selective circuit to condition said frequency selective circuit to deliver to said second detector only a particular modulated frequency having a waveform substantially the same as said beat signals, an indicating device coupled to said second detector, said second detector effective to deliver to said indicating device an output in dependency on said intelligence signals.

5. In a radio communication system, means for receiving interference signals having a first frequency and desired signals having a second frequency modulated by intelligence signals, said interference signals having an amplitude at least four times as great as the amplitude of said desired signals, a detector connected to said means and responsive to said interference signals and to said desired signals to produce a waveform including at least said first frequency, said first frequency modulated by said intelligence signals, said second frequency and beat signals having a frequency equal to the difference between said first frequency and said second frequency and modulated by said intelligence signals, a first selective circuit coupled to the detector to reject said first frequency and said second frequency, a second detector, a second selective circuit coupled between the first selective circuit and the second detector, said second frequency selective circuit having predetermined parameters selected to pass only one of a plurality of modulated frequencies, switching means connected to said second selective circuit to condition said second selective circuit to deliver to said second detector only a particular modulated frequency having a waveform substantially the same as said beat signals, an indicating device coupled to said second detector, said detector effective to deliver to said indicating device an output in dependency on said intelligence signal.

References Cited in the file of this patent

UNITED STATES PATENTS

| | | |
|---|---|---|
| 1,361,522 | Espenschied | Dec. 7, 1920 |
| 2,094,625 | Thompson | Oct. 5, 1937 |
| 2,103,878 | Thompson | Dec. 28, 1937 |
| 2,111,738 | Roberts | Mar. 22, 1938 |
| 2,279,246 | Podliasky et al. | Apr. 7, 1942 |
| 2,308,280 | Green | Jan. 12, 1943 |
| 2,405,930 | Goldberg et al. | Aug. 13, 1946 |
| 2,410,736 | Hoisington | Nov. 5, 1946 |
| 2,413,981 | Luck | Jan. 7, 1947 |
| 2,435,960 | Fyler | Feb. 17, 1948 |
| 2,462,859 | Grieg | Mar. 1, 1949 |
| 2,480,171 | White | Aug. 30, 1949 |
| 2,627,023 | Page | Jan. 27, 1953 |

OTHER REFERENCES

Terman: Radio Engineer's Handbook, pp. 557–559.